US 6,658,352 B2

(12) United States Patent
Abe et al.

(10) Patent No.: US 6,658,352 B2
(45) Date of Patent: Dec. 2, 2003

(54) NAVIGATION SYSTEM

(75) Inventors: Yuichi Abe, Tottori (JP); Tomoyuki Yoshimura, Tottori (JP); Susumu Iida, Tottori (JP); Akiyoshi Yamamoto, Tottori (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/979,514

(22) PCT Filed: Jan. 30, 2001

(86) PCT No.: PCT/JP01/00602
§ 371 (c)(1),
(2), (4) Date: Nov. 14, 2001

(87) PCT Pub. No.: WO01/71286
PCT Pub. Date: Sep. 27, 2001

(65) Prior Publication Data
US 2002/0161521 A1 Oct. 31, 2002

(30) Foreign Application Priority Data
Mar. 23, 2000 (JP) ........................................ 2000-081654

(51) Int. Cl.[7] .......................... G01C 21/30; G01C 21/26
(52) U.S. Cl. ........................ 701/213; 701/208; 701/209; 701/211; 701/214; 340/990; 340/995.1; 340/995.17; 340/995.19
(58) Field of Search ................................. 701/213, 211, 701/208, 209, 212, 214; 340/988, 990, 995, 995.1, 995.17, 995.19; 342/357.15, 357.06, 357.17; 370/252, 332

(56) References Cited

U.S. PATENT DOCUMENTS

| 6,132,391 A | * | 10/2000 | Onari et al. ................ 600/595 |
| 6,327,533 B1 | * | 12/2001 | Chou ......................... 701/207 |
| 6,400,690 B1 | * | 6/2002 | Liu et al. .................... 370/252 |
| 6,452,545 B2 | * | 9/2002 | Araki et al. ........... 342/357.15 |
| 2002/0049630 A1 | * | 4/2002 | Furuta et al. ................. 705/13 |

FOREIGN PATENT DOCUMENTS

| JP | 7-139960 | 6/1995 | ........... G01C/21/00 |
| JP | 7-286853 | 10/1995 | ........... G01C/21/00 |
| JP | 10-153444 | 6/1998 | ........... G01C/21/00 |
| JP | 11-344355 | 12/1999 | ........... G01C/21/00 |

* cited by examiner

Primary Examiner—Jacques H. Louis-Jacques
(74) Attorney, Agent, or Firm—Fish & Richardson P.C.

(57) ABSTRACT

The present invention is directed to a navigation apparatus capable of performing a proper voice guidance even in such a case that signals transmitted from GPS satellites cannot be received, but a current location cannot be judged. The navigation apparatus of the present invention is featured by such a navigation apparatus in which signals transmitted from GPS satellites are received so as to measure a current location, the measured current location is displayed on a screen in connection with a map, a guidance route up to a destination place is set, and a guidance is notified every predetermined guidance point. In this navigation apparatus, when the signals transmitted from the GPS satellites cannot be received, if a current location is located on the guidance route, then a virtual current location is displayed in such a manner that the virtual current location is moved on the guidance route at a predetermined speed, and a guidance is notified every predetermined guidance point.

9 Claims, 5 Drawing Sheets

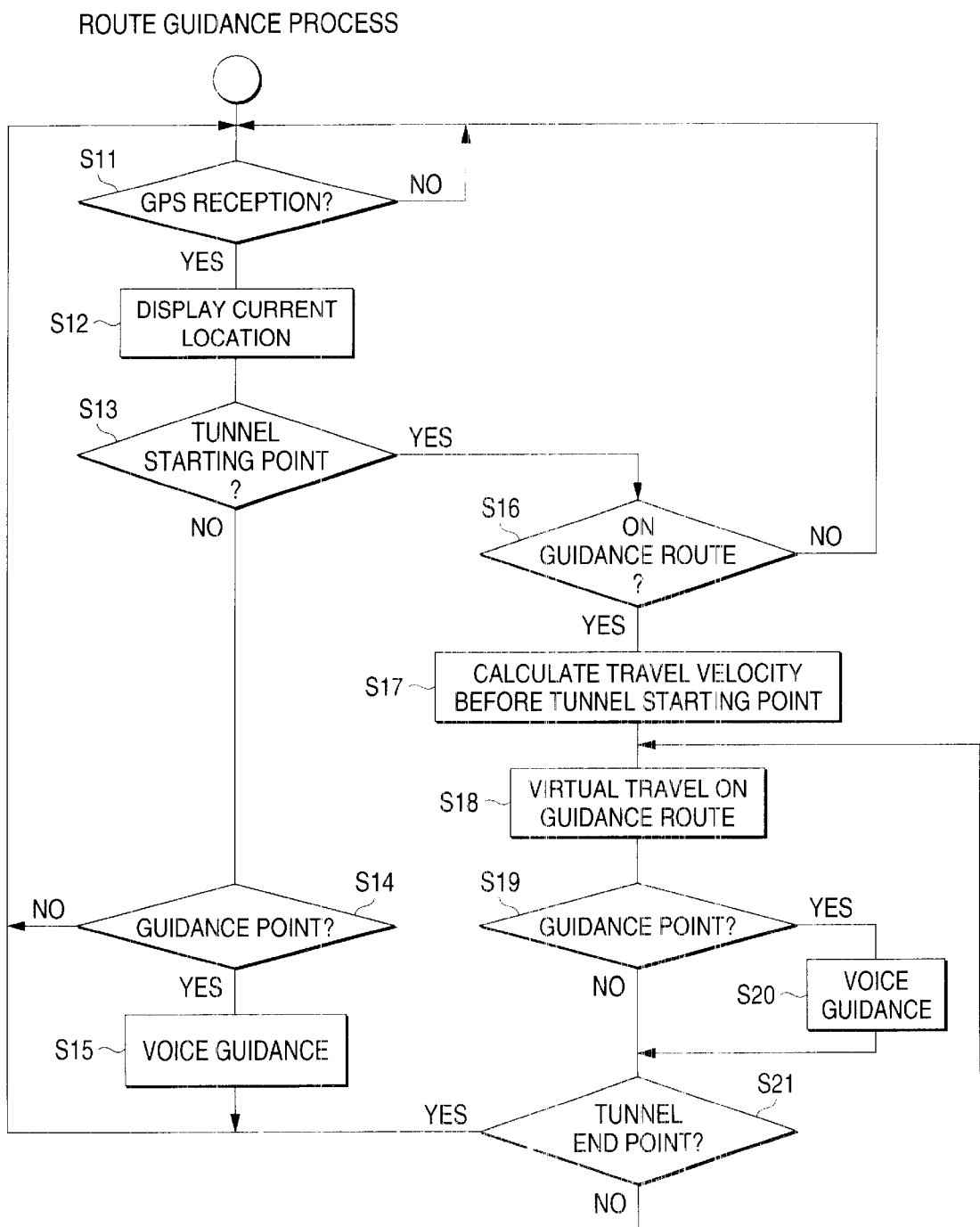

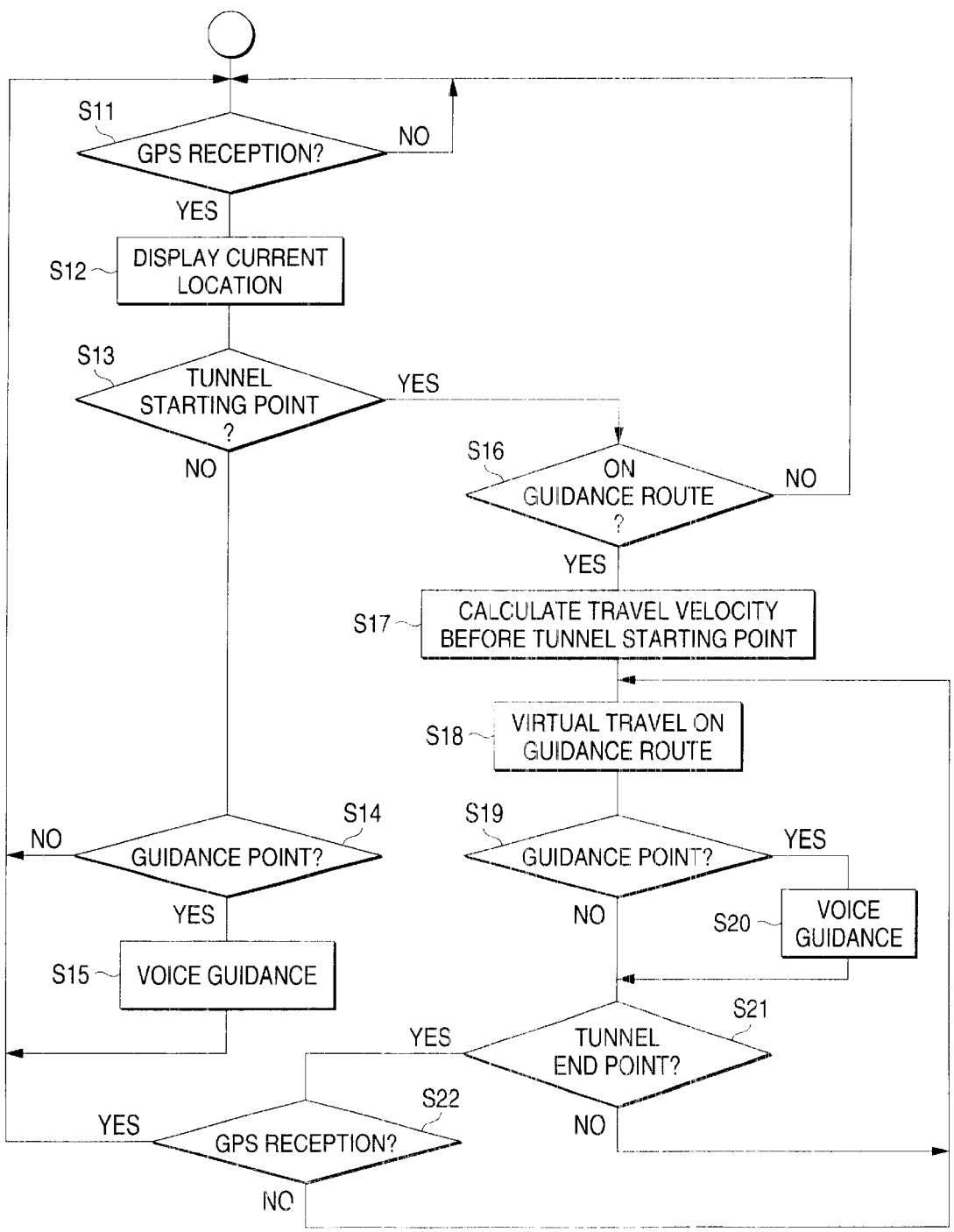

NAVIGATION SYSTEM

TECHNICAL FIELD

The present invention is related to a navigation apparatus for displaying a drive position of an automobile and the like on a map based upon information acquired from a GPS (Global Positioning System).

BACKGROUND ART

Recently, navigation apparatus are rapidly popularized, while the navigation apparatus measure current locations based upon information acquired from the GPS, and read out map data containing these current locations from a CD-ROM and the like so as to display map images where the current locations are located at a center.

This type of navigation apparatus not only displays a current location on a map, but also calculates an optimum route defined from a departure place up to a destination place, and then sequentially guides a route in response to current locations in either a voice manner or a display manner, as disclosed in, for example, Japanese Patent Publication No. Hei. 11-344355.

As this guidance mode, with respect to a present road link, the navigation apparatus judges direction/angle/distance up to a crossing as to such a road link where the own vehicle is planned to be turned. When the own vehicle is located at a predetermined point in front of the crossing, the navigation apparatus reproduces by a speaker, such a message, for example, "Approximately 300 meters ahead, please proceed in the oblique left direction", and "Soon after, please turn to the left. Take care of your drive."

However, in accordance with the above-explained arrangement, when the own vehicle enters into, for example, a tunnel and thus cannot receive signals transmitted from the GPS satellites, since the current location cannot be measured, the navigation apparatus cannot judge a point where a voice guidance is made, so that the voice guidance cannot be performed as explained above. In particular, in the case that there are an exit of a superhighway and a direction turning point on the guidance route in the vicinity of the exit of the tunnel, since no voice guidance is made, there is a certain case that the own vehicle may mistakenly pass through this exit of the superhighway and the direction turning point.

DISCLOSURE OF THE INVENTION

The present invention has been made to solve the above-explained problem, and is to provide such a navigation apparatus by which when signals transmitted from GPS satellites cannot be received, and also when a current location is located on a guidance route during a calculation time period after the signals transmitted from the GPS satellites have been received, a virtual current location is displayed in such a manner that the virtual current location is moved on the guidance route at a predetermined speed, and then, a guidance is notified in response to this virtual current location.

Also, in another navigation apparatus of the present invention, in the case that a starting point of a tunnel is detected as a current location, if the current location is located on the guidance route, then a virtual current location is displayed in such a manner that the virtual current location is moved on the guidance route at a predetermined speed, and a guidance is notified every predetermined guidance point.

Also, another navigation apparatus of the present invention is featured by that a virtual current location is displayed in such a manner that the virtual current location is moved on the guidance route after an end point of the tunnel has been detected as a current location until signals transmitted from GPS satellites are received to output a calculation result of the current location, and the guidance notification is continued in response to the virtual current location.

BRIEF DESCRIPTION OF THE DRAWINGS

FIG. 4 is a flow chart for describing a program of a major process portion related to a route guidance process operation, according to a second embodiment, which is written in a ROM.

FIG. 5 is a flow chart for describing a program of a major process portion related to a route guidance process operation, according to a third embodiment, which is written in a ROM.

Figure 1:
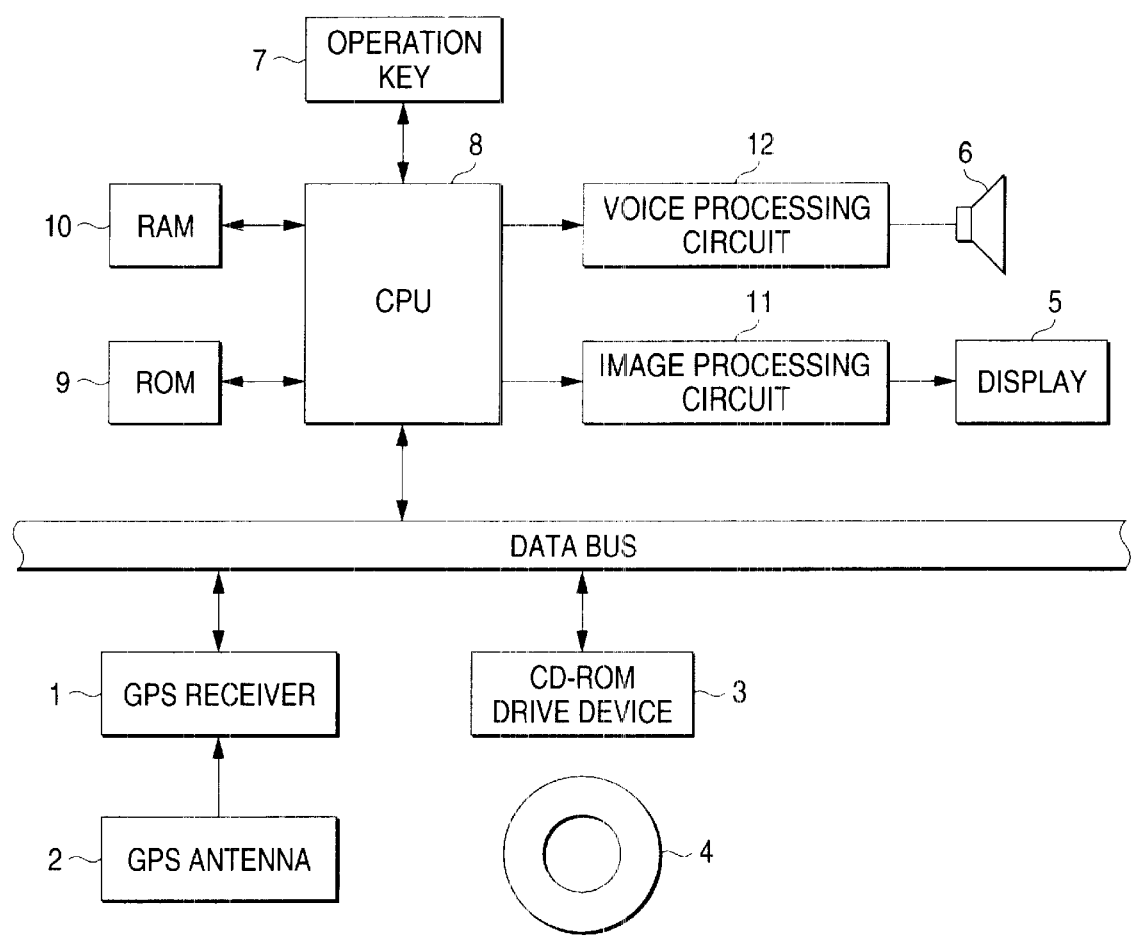
FIG. 1 is a block diagram of a navigation apparatus according to the present invention.

It should be noted that in the drawings, reference numeral 1 shows a GPS receiver, reference numeral 3 represents a CD-ROM drive device, reference numeral 4 indicates a recording medium, reference numeral 5 shows a liquid crystal display, reference numeral 6 indicates a speaker, reference numeral 7 denotes an operation key, reference numeral 8 indicates a CPU, reference numeral 9 represents a ROM, reference numeral 10 shows a RAM, reference numeral 11 indicates an image processing circuit, and reference numeral 12 shows a voice processing circuit.

BEST MODE FOR CARRYING OUT THE INVENTION

Referring now to drawings, embodiments of navigation apparatus according to the present invention will be described.

FIG. 1 is a block diagram for representing a navigation apparatus of the present invention.

In FIG. 1, a GPS receiver 1 performs a trigonometrical survey based upon signals transmitted from GPS satellites traveled along the earth orbits, which are received by a GPS antenna 2, and calculates/acquires a latitude and also a longitude of the own vehicle.

A CD-ROM drive device 3 reads out map data from a CD-ROM 4 on which the map data has been recorded.

A display 5 is constituted by, for instance, liquid crystal, and displays thereon a current location and a map.

A speaker 6 is employed so as to perform a voice guidance. An operation key 7 corresponding to an input means is arranged on a front surface of the navigation apparatus. The operation key 7 contains a key used to instruct enlargement/reduction of a displayed map, a key used to instruct a route search, a key employed to instruct a departure place and a destination place in a route search, and the like.

A CPU 8 executes various sorts of calculations in accordance with a program which has been written in a ROM 9. The CPU 8 writes this calculation result, for example, the map data derived from the CD-ROM drive device 3, the current location data received from the GPS receiver 1, and the like into a RAM 10.

An image processing circuit 11 forms a display image based upon both the map data and the current location data, which are calculation-processed by the CPU 8, and produces a signal used to display this display image on the liquid crystal display 5.

A voice processing circuit 12 produces a voice message in response to an instruction issued from the CPU 8, and drives a speaker 6 by using this voice message.

It should be noted that in the embodiment shown in FIG. 1, the description is made of the arrangement with employment of the CD-ROM drive device 3 and the operation key 7. In accordance with the present invention, other recording medium drive means for driving recording media (for instance, DVD, semiconductor memory, and the like) other than the CD-ROM may be employed.

Also, as the input means, voice inputs other than the operation key 7 shown in this drawing may apparently achieve a similar function.

In the CD-ROM 4, background data, road data, and the like have been written every unit map. This unit map is defined by dividing a map diagram of an entire area in Japan based upon a latitude and also a longitude. The background data is constituted by such data used to illustrate a road, a facility, and the like.

The road data is constituted by such data related to a coordinate system point (node) and a line (link), which describe a road containing a crossing (intersection), for instance, data as to a node number of a node, data as to a latitude and a longitude, data as to a link number of a link, data as to a link distance, and so on.

In particular, as the road data of the present invention, for example, while a starting point (namely, starting position) of a tunnel and an end point (namely, end position) thereof are defined as a coordinate point (node), and a length of this tunnel is defined as a line (link), a road mode recorded on the recording medium may be employed.

Next, a description will now be made of a route searching process operation executed by the CPU 8.

When a departure place and a destination place are instructed after the route searching instruction is made by operating the operation key 7, the CPU 8 determines a departure place node and also a destination place node, which correspond to the departure place and the destination place. Then, the CPU 8 calculates a guidance route which starts from the departure place node to the destination place node in accordance with a predetermined parameter (superhighway owns priority etc.), and writes the data of this calculated guidance route into the RAM 10.

This guidance route is arranged by such data about a plurality of nodes which are present between the departure place node and the destination place node.

Then, a plurality of these calculated nodes are sequentially coupled to each other by links, so that a line-shaped quasi-route which corresponds to a road on a map may be obtained.

When the CPU 8 calculates the guidance route, this CPU 8 instructs the image processing circuit 11 in such a manner that the guidance route is indicated in a red color along a road indicated on a map of the liquid crystal display 5. Then, the CPU 8 guides the route on the map of the liquid crystal display 5 in such a manner that a current location acquired from the GPS receiver 1 may be progressed over the guidance route.

Figure 2:
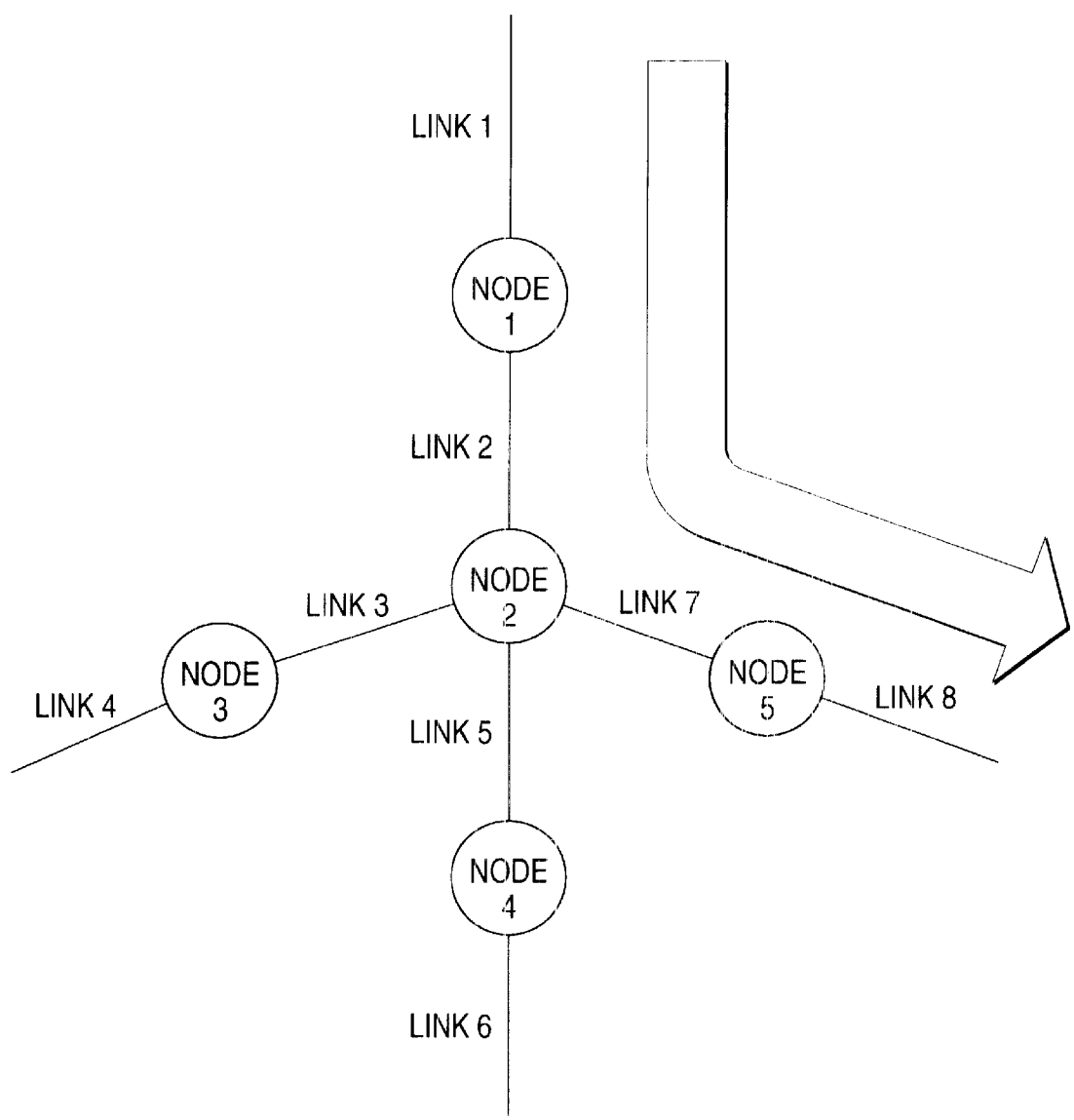
FIG. 2 is a schematic diagram of showing nodes and links in the navigation apparatus of the present invention.

The route guidance is performed as follows. For instance, in the case that the current location is progressed from a link 2 to a link 7, corresponding to a direction of an arrow shown in FIG. 2, the CPU 8 compares a coordinate value of node 2 with a coordinate value of a node 5, which are equal to nodes of a crossing, so as to calculate a direction and an angle defined from the link 2 to the link 7. Also, the CPU 8 calculates a distance defined from the current location up to the node 2, and determines a voice message corresponding to the calculated results.

As this voice message, the CPU 8 instructs the voice processing circuit 12 in such a manner that when a distance defined from the current location up to the node 2 becomes 300 meters, for example, this voice processing circuit 12 reproduces such a voice message "Approximately 300 meters ahead, please proceed in the oblique left direction." Also, in the case that a distance defined from a current location up to the node 2 becomes 100 meters, for example, the CPU 8 instructs the voice processing circuit 12 so reproduce such a voice message "Soon after, please proceed in the oblique left direction. Be care of your attention."

Figure 3:
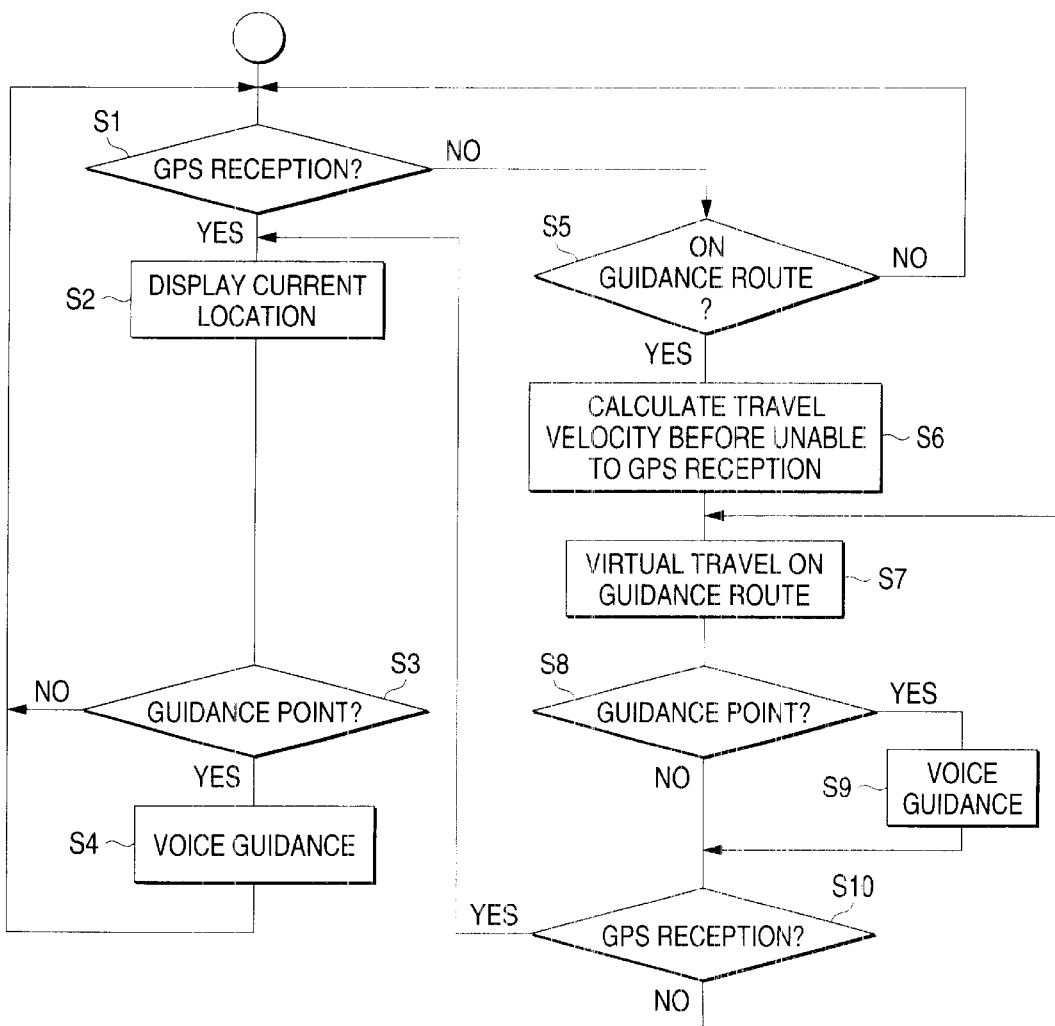
FIG. 3 is a flow chart for describing a program of a major process portion related to a route guidance process operation, according to a first embodiment, which is written in a ROM.

FIG. 3 shows a flow chart for executing a basic route guidance according to the present invention.

Now, the route guidance of the flow chart shown in FIG. 3 will be described in detail.

First, the CPU 8 judges as to whether or not the CPU 8 judges signals transmitted from the GPS satellites are received (step S1).

At the step 1, in the case that the GPS receiver 1 receives the signals transmitted from the GPS satellites, the CPU 8 calculates a current location based upon the signals derived from the GPS receiver 1. Furthermore, the CPU 8 reads such map data containing the calculated current location via the CD-ROM drive device 3 from the CD-ROM 4, and displays this read map data as the current location on a map indicated on the display 5 (step S2).

Also, at this time, a guidance route is displayed in a color such as a red color, or in a display mode different from the display modes of other road indicates on the map.

When the GPS receiver 1 continuously receives the signals transmitted from the GPS satellites, the process operations defined at the step S1 and the step S2 are repeatedly carried out.

As a result, when the current location is moved, a position which is calculated by receiving signals transmitted from the GPS satellites is displayed in such a manner that this calculated position is moved from time to time on such a road which is specified as the guidance route on the map indicated on the display 5.

Then, when the current location is moved on the guidance route, and then, as explained above, the current location becomes a voice guidance point (step 53), such a proper instruction is issued in response to a distance up to a branch point, a turning direction, and also a turning angle. For example, a voice message is reproduced by the speaker 6 (step S4).

In this case, such a guidance is not limited to a voice message, but may be indicated by way of a character and the like on the display.

In such a case that the GPS receiver 1 cannot receive signals transmitted from the GPS satellites (namely, "N" of step S1), for example, when the own vehicle is driven through a tunnel and the like, the CPU 8 judges as to whether or not the current location is located on the guidance route and this current location is acquired just before the GPS receiver 1 cannot receive the signals sent from the GPS satellites (step S5).

When the current location is not located on the guidance route at the step S5, the process operation is returned to the step S1 (namely, "N" at step S5).

In this case, such a display condition of the liquid crystal display 5 just before the GPS receiver 1 cannot receive the signals transmitted from the GPS satellites is maintained until the GPS receiver 1 may again receive signals transmitted from the GPS satellites.

At the step S5, if the current location is located on the guidance route, then the CPU 8 calculates a travel velocity of the vehicle immediately before the GPS receiver 1 cannot receive the signals transmitted from the satellites (step S6).

Both a map and a virtual current location are displayed on the display 7 based upon the speed calculated at the step S6 until the reception of the GPS signal is restarted in such a manner that the current location is virtually moved on the guidance route at this travel velocity (step S7).

Then, in this virtual travel at the step S7, the CPU 8 judges as to whether or not the current location is equal to a guidance point (voice guidance point in this embodiment) (step S8).

At the step S8, in the case that the current location is equal to the guidance point, the CPU 8 instructs the voice processing circuit 12 to reproduce a proper voice message by the speaker 6, and this proper voice message is determined in response to a distance defined up to a branch point, a turning direction of the vehicle, and a turning angle thereof (step S9).

Under this virtual move condition, when the reception of the signals transmitted from the GPS satellites is restarted, the process operation is advanced to the step S2 at which a current location calculated based upon the signals transmitted from the GPS receiver 1 is indicated on the map of the display 5.

As explained above, in the first embodiment shown in FIG. 1, while the vehicle is driven along the guidance route, even in such a case that the vehicle enters into the tunnel and the GPS signal cannot be received, the route guidance by the voice message can be carried out.

It should also be noted that in the flow chart of FIG. 3, the CPU calculates the travel velocity immediately before the GPS signal cannot be received, and then, the current location is virtually moved on the guidance route at this calculated travel velocity. Alternatively, since the travel velocity is properly changed even in the tunnel, while actual travel velocitys of the vehicle are always detected from a speed meter and the like, the current location may be displayed on the guidance route by correcting the above-described calculated travel velocity based upon the actual travel velocitys.

Also, in the above-described first embodiment, the CPU judges as to whether or not the GPS receiver 1 receives the signals transmitted from the GPS satellites. In such a case that the GPS receiver 1 does not receive the signals transmitted from the GPS satellites, and furthermore, the current location is moved on the guidance route, the move process operation of the virtual current location is carried out. Alternatively, while attributes are added to nodes, for example, such a CD-ROM may be used in which starting points of tunnels and end points thereof have been stored in the attributes. While the vehicle is driven, when the CPU judges an attribute of a node to detect a starting point of a tunnel, and furthermore, when the vehicle is moved on the guidance route, the move process operation of the virtual current location may be carried out.

FIG. 4 is a flow chart for describing a second embodiment, and operations will now be explained with reference to this flow chart.

First, the CPU 8 judges as to whether or not the GPS receiver 1 receives signals transmitted from the GPS satellites (step S11).

At the step S11, in such a case that the GPS receiver 1 does not receives the signals transmitted from the GPS satellites, the CPU 8 maintains a display condition of the liquid crystal display 5 at this time until the reception of the signals transmitted from the GPS satellites is restarted.

At the step S11, in the case that the GPS receiver 1 receives the signals transmitted from the GPS satellites, the CPU 8 calculates a current location based upon the signals derived from the GPS receiver 1. Furthermore, the CPU 8 reads such map data containing the calculated current location via the CD-ROM drive device 3 from the CD-ROM 4, and displays this read map data as the current location on a map indicated on the display 5 (step S12). Also, at this time, a guidance route is displayed in a color such as a red color, or in a display mode different from the display modes of other road indications on the map.

When the GPS receiver 1 continuously receives the signals transmitted from the GPS satellites, the process operations defined at the step S11 and the step S12 are repeatedly carried out. As a result, when the current location is moved, this current location is displayed in such a manner that this calculated position is moved from time to time on such a road which is specified as the guidance route on the map indicated on the display 5.

Next, the CPU 8 judges as to whether or not the current location corresponds to the starting point of the tunnel which has been set as the node (step S13).

When the current location is not equal to the starting point of the tunnel at the step S13, the current location is moved on the guidance route, and then, as explained above, the current location becomes a voice guidance point (step S14), such a proper instruction is issued to the voice processing circuit 12 in response to a distance up to a branch point, a turning direction, and also a turning angle. For example, a voice message is reproduced by the speaker 6 (step S15).

In this case, such a guidance is not limited to a voice message, but may be indicated by way of a character and the like on the display.

On the other hand, in the case that the CPU 8 judges that the attribute of the node corresponds to the starting point of the tunnel, this CPU 8 checks as to whether or not the current location is located on the guidance route (step S16).

When the current location is not located on the guidance route at the step S16, the CPU 8 may judge that the current location is not moved on the guidance route, and then, the process operation is returned to the step S11 (namely, "N" at step S16).

When the current location is located on the guidance route at the step S16, the CPU 8 calculates a travel velocity of the own vehicle before the starting point of the tunnel (step S17).

Then, both a map and a current location on the map are indicated on the liquid crystal display 5 in such a manner that the current location is virtually moved on the guide path at this calculated travel velocity (step S18).

It should also be noted that in the flow chart of FIG. 4, the CPU calculates the travel velocity immediately before the GPS signal cannot be received, and then, the current location is virtually moved on the guidance route at this calculated travel velocity. Alternatively, since the travel velocity is properly changed even in the tunnel, while actual travel velocitys of the vehicle are sequentially detected from a speed meter and the like, the current locations maybe displayed on the guidance route by correcting the above-described calculated travel velocity based upon the actual travel velocitys.

Then, in this virtual drive at the step S18, the CPU 8 judges as to whether or not the current location is equal to a voice guidance point (step S19).

At the step S19, in the case that the current location is equal to the guidance point, the CPU 8 instructs the voice processing circuit 12 to reproduce a proper voice message by the speaker 6, and this proper voice message is determined in response to a distance defined up to a branch point, a turning direction of the vehicle, and a turning angle thereof (step S20).

Next, in the case that the CPU 8 detects that the attribute of the node corresponds to the end point of the tunnel under the virtual move condition, the process operation is advanced to the step S11. At this step S11, a current location calculated based on signals derived from the GPS receiver 1 is displayed on the liquid crystal display 5.

FIG. 5 is a flow chart for indicating a third embodiment.

It should be understood that since flow operations executed in the third embodiment shown in FIG. 5 are similar to those of the second embodiment indicated in FIG. 4 except that the flow operations of this third embodiment own a step 22, explanations as to the same flow operations are omitted, and a featured portion of this third embodiment is described as flows:

In the second embodiment shown in FIG. 4, when the CPU detects that the attribute of the node corresponds to the end point of the tunnel, the process operation is advanced to the step 11. However, there is a certain case that the GPS receiver 1 immediately receives signals transmitted from the GPS satellites, but the CPU cannot judge the current location, depending upon capability of this GPS receiver 1 and also environmental conditions in the vicinity of the end point of the tunnel.

While this current location cannot be judged, when the vehicle is reached to a guidance point, for example, since a voice guidance cannot be made, in the third embodiment, a virtual move process operation and a route guidance are carried out. That is, as indicated in the flow chart of the third embodiment shown in FIG. 5, even when the CPU judges that the attribute of the node corresponds to the end point of the tunnel at the step 21, the CPU executes both the virtual move process operation and the route guidance until the GPS receiver 1 receives the signals transmitted from the GPS satellites, and also the CPU can judges the current location (step S22). With execution of such operations, a more adequate guidance can be carried out.

INDUSTRIAL APPLICABILITY

Since the present invention has been arranged in accordance with the above-described manner, for instance, even in such a case that while the signals transmitted from the GPS satellites cannot be received, there are an exit of a superhighway and a direction turning point on a guidance route within such a tunnel where a current location cannot be judged, a very proper guidance can be made without an occurrence of such a difficulty that the vehicle mistakenly passes through this exit of the superhighway and also the direction turning point.

What is claimed is:

1. A navigation apparatus in which signals transmitted from GPS satellites are received so as to measure a current location, the measured current location is displayed on a screen in connection with a map, a guidance route up to a destination place is set, and a guidance is notified every predetermined guidance point, wherein, in the case that the signals transmitted from the GPS satellites cannot be received, if a current location is located on said guidance route, then a virtual current location is displayed so that the virtual current location is moved on said guidance route at a predetermined velocity, and a guidance is notified every predetermined guidance point.

2. A navigation apparatus in which signals transmitted from GPS satellites are received so as to measure a current location, the measured current location is displayed on a screen in connection with a map, a guidance route up to a destination place is set, and a guidance is notified every predetermined guidance point, wherein, in the case that a starting point of a tunnel is detected as a current location, if the current location is located on said guidance route, then a virtual current location is displayed in such a manner that the virtual current location is moved on said guidance route at a predetermined speed, and a guidance is notified every predetermined guidance point.

3. A navigation apparatus as claimed in claim 2, wherein the virtual current location is displayed in such a manner that said virtual current location is moved on said guidance route after an end point of the tunnel has been detected as a current location until signals transmitted from GPS satellites are received to output a calculation result of the current location, and the guidance notification is continued in response to said virtual current location.

4. A navigation apparatus comprising:

a receiver to receive signals transmitted from GPS satellites;

a processor to calculate a current location based on the GPS signals received from the receiver;

a screen coupled to the processor to display the current location in connection with a map and a guidance route up to a destination entered into the apparatus by a user; and a circuit to notify a predetermined guidance point along the guidance route, wherein if the signals transmitted from the GPS satellites are interrupted and if the current location is located on said guidance route, then a virtual current location in the display is moved on said guidance route at a predetermined velocity while notifying every predetermined guidance point along the guidance route.

5. The navigation apparatus as claimed in claim 4, wherein the circuit is a voice processor to notify every predetermined guidance point along the guidance route by a voice message.

6. The navigation apparatus as claimed in claim 4, wherein the circuit sends signals to the display to display a character for every predetermined guidance point along the guidance route.

7. The navigation apparatus as claimed in claim 4, wherein if the processor detects a starting point of a tunnel as the current location and if the current location is located on said guidance route, then the virtual current location is moved on said guidance route at a predetermined speed.

8. The navigation apparatus as claimed in claim 7, wherein the virtual current location is moved along said guidance route even after an end point of the tunnel has been detected by the processor until signals transmitted from the GPS satellites are received by the receiver and the processor to calculate the current location.

9. The navigation apparatus as claimed in claim 4, further comprising:

a CD driver for sending signals to display a map in connection with the current location calculated by the processor.

\* \* \* \* \*